United States Patent
Watanabe

(10) Patent No.: US 7,463,286 B2
(45) Date of Patent: Dec. 9, 2008

(54) IMAGE DATA PROCESSING APPARATUS

(75) Inventor: Tohru Watanabe, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 560 days.

(21) Appl. No.: 10/531,768

(22) PCT Filed: Dec. 10, 2003

(86) PCT No.: PCT/JP03/15773

§ 371 (c)(1),
(2), (4) Date: Apr. 19, 2005

(87) PCT Pub. No.: WO2004/053794

PCT Pub. Date: Jun. 24, 2004

(65) Prior Publication Data

US 2006/0012686 A1 Jan. 19, 2006

(30) Foreign Application Priority Data

Dec. 11, 2002 (JP) .............................. 2002-359509

(51) Int. Cl.
*H04N 5/228* (2006.01)
(52) U.S. Cl. ..................................... 348/222.1; 348/254
(58) Field of Classification Search .............. 348/222.1, 348/254, 219, 220, 222, 279, 335, 369
See application file for complete search history.

(56) References Cited

U.S. PATENT DOCUMENTS

| | | | | |
|---|---|---|---|---|
| 6,018,363 A | * | 1/2000 | Horii | 348/219.1 |
| 6,295,087 B1 | * | 9/2001 | Nohda | 348/234 |
| 6,542,192 B2 | * | 4/2003 | Akiyama et al. | 348/333.11 |
| 6,904,166 B2 | * | 6/2005 | Hsia et al. | 382/162 |
| 7,068,314 B1 | * | 6/2006 | Nakajima et al. | 348/273 |
| 7,116,358 B1 | * | 10/2006 | Sasaki | 348/222.1 |
| 7,136,097 B1 | * | 11/2006 | Toyoda et al. | 348/222.1 |
| 2002/0047908 A1 | * | 4/2002 | Mise et al. | 348/222 |
| 2002/0176014 A1 | * | 11/2002 | Bompard | 348/253 |
| 2003/0048361 A1 | * | 3/2003 | Safai | 348/222.1 |

FOREIGN PATENT DOCUMENTS

| | | |
|---|---|---|
| JP | 01-229382 | 9/1989 |
| JP | 04-060777 | 2/1992 |
| JP | 2000-036918 | 2/2000 |
| JP | 2000-293619 | 10/2000 |

\* cited by examiner

*Primary Examiner*—Lin Ye
*Assistant Examiner*—Amy Hsu
(74) *Attorney, Agent, or Firm*—Hogan & Hartson LLP

(57) ABSTRACT

A first processing circuit subjects image data output from an A/D converter circuit to a first signal process to produce first image data. A second processing circuit subjects image data to a second signal process, which is independent of the first signal process, to produce second image data. The first and second processing circuits execute the first and second signal processes in a parallel manner to output the first and second image data to a display device and a system microcomputer.

4 Claims, 11 Drawing Sheets

IMAGE DATA PROCESSING APPARATUS

TECHNICAL FIELD

The present invention relates to an image data processing apparatus for performing a predetermined signal processing on input image data and generating an output data for supplying to an external apparatus.

BACKGROUND ART

In a conventional system, image data are output from an imaging apparatus to a plurality of external apparatuses, and the external apparatuses perform various types of signal processing such as image processing for display, analysis, and special effects. According to an example processing for display, image data conforming to a standard format is output from an imaging apparatus, and reductions in pixel density and gradation of the image data are performed on the display apparatus side so as to convert the pixel density and gradation into a format that can be displayed on a display panel. For example, in an example analysis processing, image data may first be obtained by scanning a barcode to read a pattern of black and white stripes. The scanned black and white array pattern is decoded and converted into code data. According to an image processing for a special effect, values of an image data output from an imaging apparatus are digitally converted to obtain, for example, a reproduced image having an impression of an oil painting by emphasizing the contours, or alternatively, a reproduced image having a sepia tone by changing the color ratios in the reproduced image.

As one example of a conventional system described above, a barcode reader system is described below in detail. According to this system, image data from an imaging apparatus is supplied to a display apparatus and to a system microcomputer for analyzing a barcode. While a monitor image is displayed on the display apparatus, barcode analysis is performed based on the image data.

FIG. 11 is a block diagram showing a schematic configuration of the barcode reader system. The system shown in FIG. 11 basically comprises an imaging apparatus 1, display apparatus 2, system microcomputer 3, and a memory 4.

The imaging apparatus 1 comprises an image sensor for capturing an object and outputting an image signal, and a signal processor for performing analog or digital signal processing with respect to the image signal. The imaging apparatus 1 performs a predetermined signal processing on an image signal supplied from the image sensor, and outputs output data as either YUV data (luminance data and chrominance data) or RGB color data.

The display apparatus 2 comprises a display panel for displaying a reproduced image, and a driver for driving the display panel in accordance with the image data supplied from the imaging apparatus 1. In the display apparatus 2, the image data from the imaging apparatus 1 is supplied to the driver after the image data is converted to have pixel density and gradation that are appropriate for displaying on the display panel. For example, when the image sensor of the imaging apparatus 1 is VGA size, having 640 horizontal pixels and 480 vertical pixels, and the display panel of the display apparatus 2 has a display pixel density of 240×120, the image data from the imaging apparatus 1 is thinned out to ¼ its original size. Further, concerning gradation, while eight bits are allocated to each of luminance data Y and chrominance data U and V for every pixel in the image data, four low-order bits may be compressed to convert the image data into four-bit data, thereby reducing gradation levels.

The system microcomputer 3 is a control device for globally controlling the overall system operation. A barcode processor 3a is provided within the system microcomputer 3. The barcode processor 3a acquires image information that has been captured by the imaging apparatus 1, and performs barcode analysis processing with respect to the acquired image information. When the image sensor of the imaging apparatus 1 has the VGA size, the barcode processor 3a acquires and digitizes an image data of 8 bits×640×480, and produces digitized data of 1 bit×640×480. Based on the digitized data, the barcode processor 3a determines a barcode array pattern, and decodes the determined array pattern to obtain code data, namely, the original data that has been converted into the barcode.

The memory 4 stores image data which were captured by the imaging apparatus 1 and image data which were processed by the system microcomputer 3. The memory 4 outputs a stored image data when the data is required during signal processing and when instructed by a user.

DISCLOSURE OF THE INVENTION

In a system as described above, image data which is output from the imaging apparatus must conform to the basic format comprising (luminance data in the form of 4 bits×640×480)+ (chrominance data in the form of 4 bits×640×480) because the barcode analysis requires image data of 1 bit×640×480, while the image processing for display requires image data comprising (luminance data in the form of 4 bits×240×120)+ (chrominance data in the form of 4 bits×240×120), and these two different types of image data must be produced from the data output by the imaging apparatus. When two different types of image data must be included in the image data supplied from the imaging apparatus, the amount of data which must be output increases, leading to various problems, such as those described below.

For example, because barcode analysis processing generally requires multiple screens of image information, the output frame rate from the imaging apparatus must be set to approximately 30 fps (frames per second). However, when a large amount of data is output from the imaging apparatus as the image data for one screen, a much greater amount of time is required for data transfer. As such, the frame rate required for barcode analysis processing cannot be attained, disadvantageously resulting in degradation of the accuracy of barcode analysis.

When, within the barcode reader system, an additional function is to be executed on the system microcomputer side to perform an image processing for a special effect, an image data for a still image comprising (luminance data in the form of 8 bits×640×480)+(chrominance data in the form of 8 bits× 640×480) is required for the image processing. For this purpose, the amount of the image data to be output from the imaging apparatus 1 becomes further increased. As such, it becomes increasingly difficult to appropriately supply the amount of image data required by the respective functions.

The above-noted problems are found not only in barcode reader systems and image processing systems, but generally exist commonly in any systems in which image data are output from an imaging apparatus to a plurality of external apparatuses which require different amounts of data or data processed in different manners of image processing.

The present invention is directed to providing an image data processing apparatus which is favorable for use in a system in which image data are output from an imaging apparatus to a plurality of external apparatuses which require different amounts of data or data processed in different manners of image processing.

The present invention provides an image data processing apparatus for performing a predetermined signal processing on an input image data and generating an output data for supplying to an external apparatus. The image data processing apparatus comprises a first processing circuit for performing a first signal processing with respect to the image data so as to produce a first image data, and a second processing circuit for performing with respect to the image data a second signal processing, which is independent from the first signal processing, so as to produce a second image data. The first and second processing circuits execute the first and second signal processing in a parallel manner, and output the first and second image data as the output data.

BEST MODE FOR CARRYING OUT THE INVENTION

Figure 1:
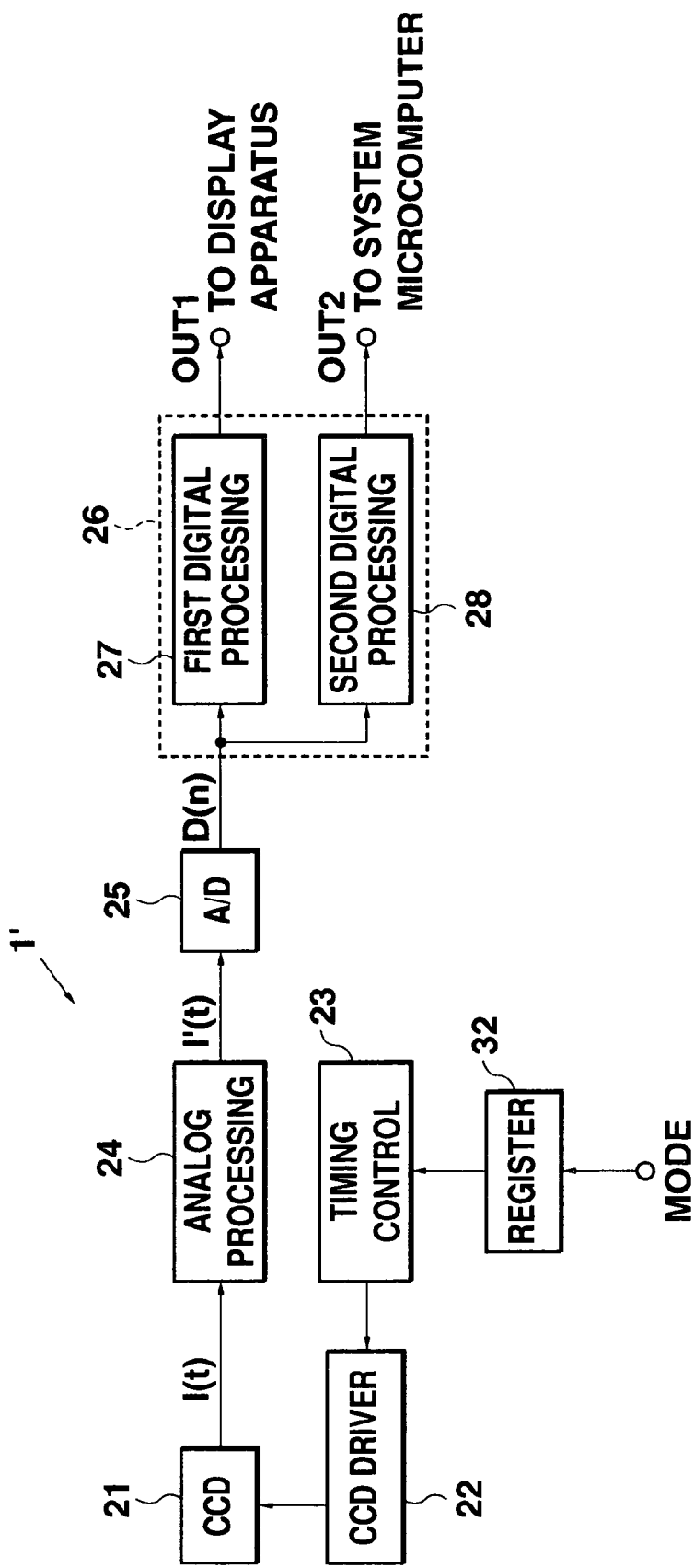
FIG. 1 is a block diagram showing the configuration of a first embodiment of the present invention.
Figure 11:
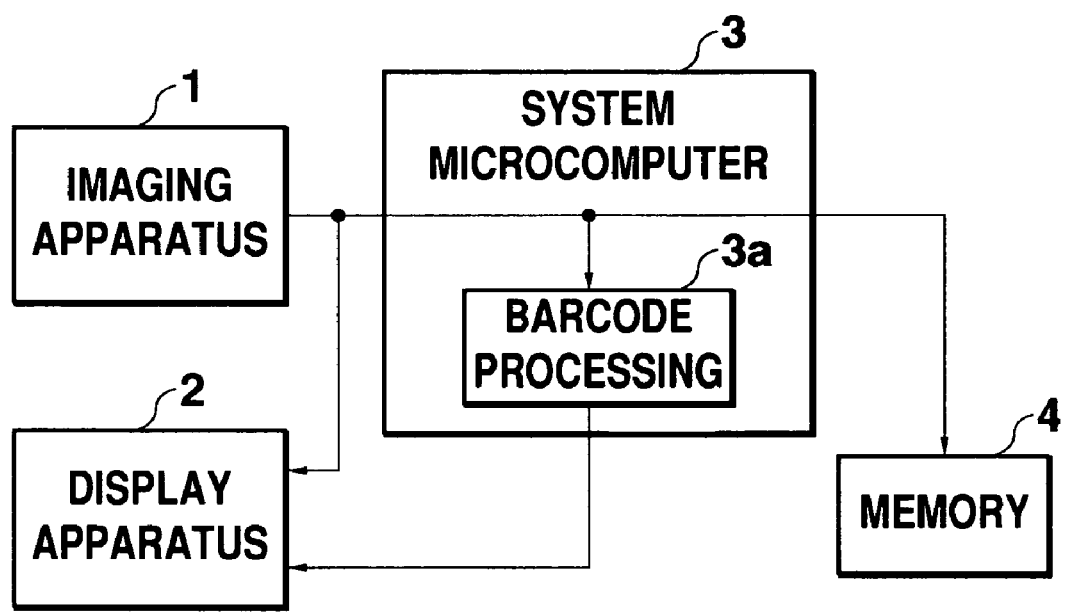
FIG. 11 is a block diagram showing a configuration of a conventional barcode reader system.

FIG. 1 is a block diagram showing the configuration of a first embodiment of the present invention. In FIG. 1, similarly as in FIG. 11, a system microcomputer 3 for executing barcode analysis processing and a display apparatus 2 for displaying a reproduced image are shown as example external apparatuses, and an imaging apparatus for use in a barcode reader system including those components is employed as an example for describing the present invention.

The imaging apparatus 1' shown in FIG. 1 includes a CCD image sensor 21, CCD driver 22, timing control circuit 23, register 32, analog processing circuit 24, A/D converter circuit 25, and digital processing circuit 26.

The CCD image sensor 21 comprises a light-receiving section including a plurality of light-receiving pixels arranged in an array, for accumulating information charges in accordance with an object image. The CCD image sensor 21 further comprises a transfer section for sequentially transferring, in units of one line, the information charges accumulated in the light-receiving section. The CCD image sensor 21 also comprises an output section for converting, in units of one pixel, the information charges transferred via the transfer section into voltage values, and outputting the voltage values as an image signal $I_{(t)}$.

The CCD driver 22 generates a plurality of drive clocks in response to various timing signals supplied by the timing control circuit 23. By supplying the plurality of drive clocks to the CCD image sensor 21, the CCD image sensor 21 is made to perform transfer operations so as to obtain the image signal $I_{(t)}$.

The timing control circuit 23 is composed of a plurality of counters for counting a reference clock CK. The timing control circuit 23 generates a vertical synchronization signal and a horizontal synchronization signal, along with a plurality of timing signal which are synchronized with the vertical synchronization signal and the horizontal synchronization signal. The timing control circuit 23 also supplies timing signals to circuits other than the CCD driver 22, thereby allowing operational timing of the respective circuits to be synchronized with the operational timing of the CCD image sensor 21.

The register 32 stores a plurality of setting data corresponding to a plurality of operation modes, such as the camera mode for performing imaging only, and the barcode analysis mode for performing barcode analysis. The register 32 receives a mode signal MODE which indicates an operation mode, and outputs a setting data corresponding to the designated operation mode. This setting data is supplied to the timing control circuit 23. In response, the timing control circuit 23 outputs timing signals to the respective circuits in accordance with the designated mode signal.

The analog processing circuit 24 performs analog signal processing such as CDS (correlated double sampling) and AGC (automatic gain control) with respect to the image signal $I_{(t)}$ output from the CCD image sensor 21. The A/D converter circuit 25 normalizes the image signal $I'_{(t)}$ output from the analog processing circuit 24, converts the signal into a digital signal, and outputs the converted signal as image data $D_{(n)}$.

The digital processing circuit 26 includes a first digital processing circuit 27 and a second digital processing circuit 28. The first digital processing circuit 27 performs, with respect to the image data $D_{(n)}$, a first signal processing for producing image data for display, and generates a first set of image data. The second digital processing circuit 28 performs, with respect to the image data $D_{(n)}$, a second signal processing for producing image data for barcode analysis processing, and generates a second set of image data. These first and second digital processing circuits 27, 28 operate in parallel with respect to inputting of the image data $D_{(n)}$. That is, while the first set of image data generated in the first digital processing circuit 27 is output from a first output terminal OUT1 to the display apparatus 2 as output data $D_{1(o)}$, the second set of image data generated in the second digital processing circuit 28 is output from a second output terminal OUT2 to the system microcomputer 3 as output data $D_{2(o)}$.

Figure 2:
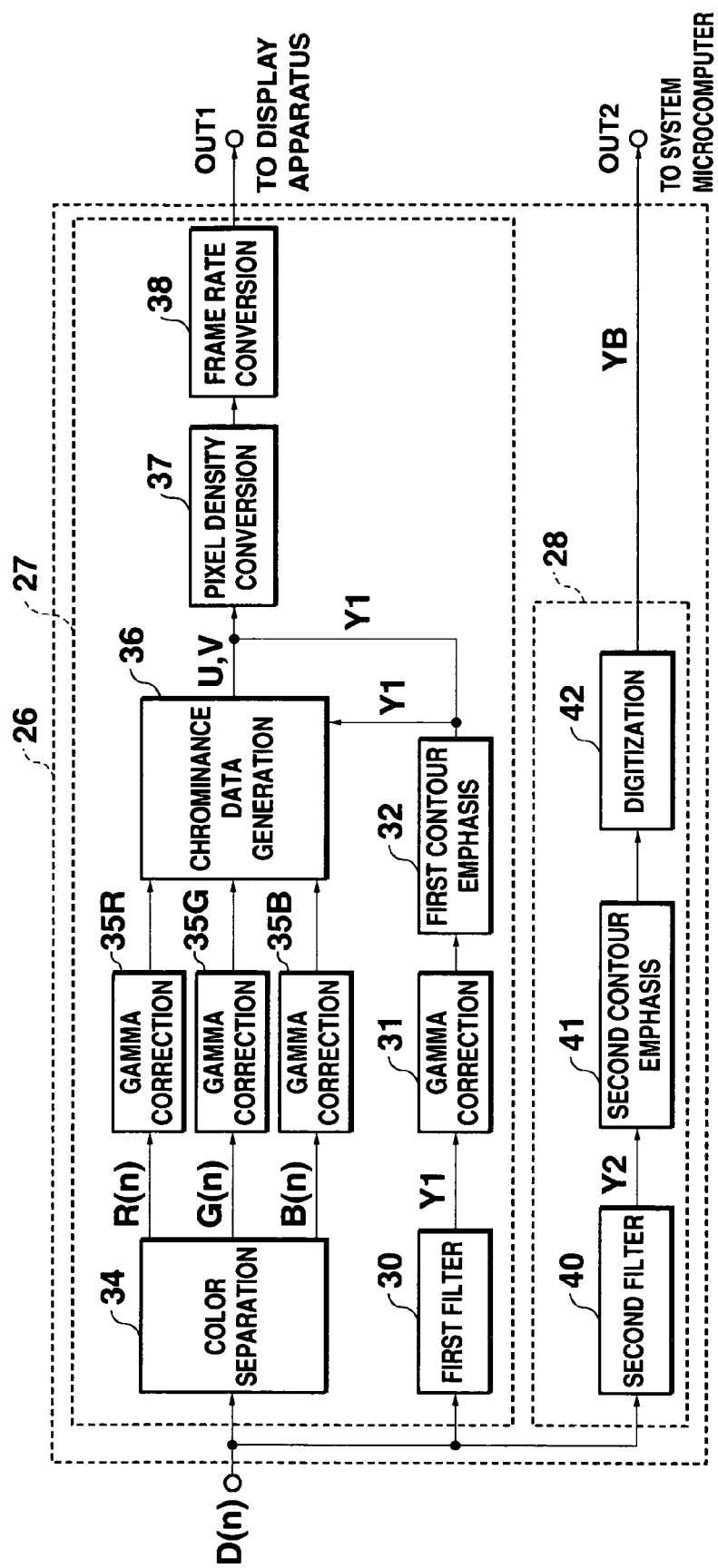
FIG. 2 is a block diagram showing the configuration of the digital processing circuit of FIG. 1.

FIG. 2 is a block diagram showing the configuration of the first and second digital processing circuits 27, 28. In FIG. 2, elements that are identical to those in FIG. 1 are labeled with the same reference numerals.

The first digital processing circuit 27 comprises a first filter 30, gamma corrector 31, and first contour emphasizer 32 as the structures which serve to generate a first luminance data $Y_1$. The first digital processing circuit 27 further comprises a color separator 34, gamma correctors $35_R$-$35_B$, and chrominance data generator 36 as the structures which serve to generate chrominance data U, V. As the structures for changing the pixel density and frame rate of the luminance data Y and chrominance data U, V, a pixel density converter 37 and a frame rate converter 38 are provided in the first digital processing circuit 27.

The first filter 30 is a filter which allows low-range components of the image data $D_{(n)}$ to pass, and serves to attenuate a first bandwidth of the image data $D_{(n)}$ so as to generate the first luminance data $Y_1$. More specifically, in the image data $D_{(n)}$, luminance data components and chrominance data components are combined by frequency division multiplexing. By allowing only the low-range components of the image data $D_{(n)}$ to pass, the luminance data components is extracted from the image data $D_{(n)}$.

The gamma corrector 31 performs, with respect to the first luminance data $Y_1$, a gamma correction processing having a non-linear conversion characteristic. The gamma corrector 31 thereby generates a corrected data in which a high-luminance portion is suppressed while a low-luminance portion is amplified. The gamma correction performed by the gamma corrector 31 compensates for a difference between the photoelectric conversion characteristic of the CCD image sensor 21 and the optical sensitivity characteristics of human visual perception.

The first contour emphasizer 32 configures, based on the corrected data for a preceding line stored in a line memory (not shown) and based on the corrected data for one line which is input from the gamma corrector 31, a spatial filter composed of a matrix including a predetermined number of values. The spatial filter is employed to acquire specific frequency components of the first luminance data $Y_1$, so as to extract edge components. By adding the data of the extracted edge components to the original luminance data, the first luminance data $Y_1$ having emphasized contours can be produced.

The color separator 34 separates the image data $D_{(n)}$ into the respective colors of RGB, thereby generating color component data $R_{(n)}$, $G_{(n)}$, and $B_{(n)}$. The color separator 34 includes therein a line memory and a filter for performing an interpolation processing. One of either the R component or the B component is absent from each even or odd line of the input image data $D_{(n)}$. By interpolating data of absent R or B components from other lines, the color component data $R_{(n)}$, $G_{(n)}$, $B_{(n)}$ for the three colors can be simultaneously output.

The gamma correctors $35_R$-$35_B$ perform a gamma correction processing with respect to the color component data $R_{(n)}$, $G_{(n)}$, $B_{(n)}$ supplied from the color separator 34, and output the corrected data to the chrominance data generator 36.

The chrominance data generator 36 generates the chrominance data U by subtracting the first luminance data $Y_1$ from the color component data $R_{(n)}$. The chrominance data generator 36 also generates the chrominance data V by subtracting the first luminance data $Y_1$ from the color component data $B_{(n)}$.

Figure 3:
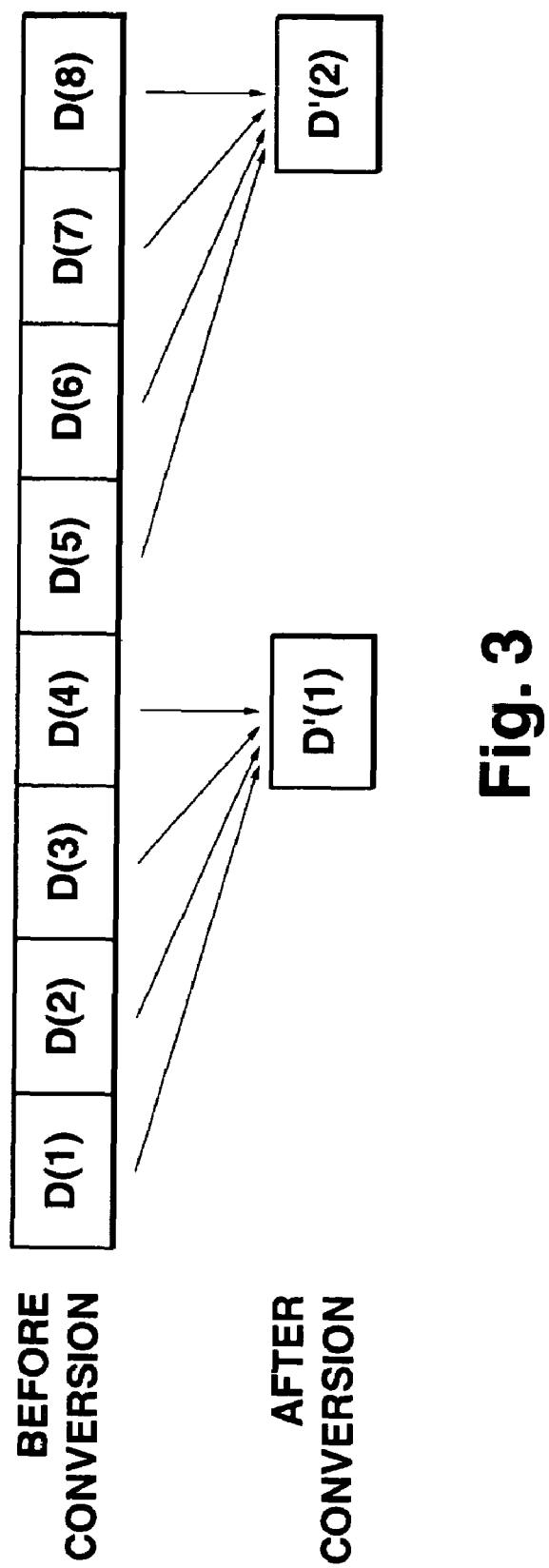
FIG. 3 is a diagram for explaining pixel density conversion.

The pixel density converter 37 configures a spatial filter based on the first luminance data $Y_1$ and chrominance data U, V for a preceding line which are stored in a line memory, and based on the first luminance data $Y_1$ and chrominance data U, V as they are input. Using the configured spatial filter, the pixel density of the image data is converted by thinning out data for appropriate number of pixels. For example, when processing the image data $D_{(n)}$ composed of the first luminance data $Y_1$ and chrominance data U, V to reduce the pixel density to ¼ as shown in FIG. 3, values of data $D_{(1)}$-$D_{(4)}$ for four contiguous pixels are added to obtain an added data, and an average of the added data is calculated to generate an average data. This average data is used as the new image data $D'_{(1)}$ to achieve pixel density conversion.

The frame rate converter 38 comprises a frame memory (not shown) which can store image data for at least one screen, and a filter. The frame rate converter 38 performs its processing based on a principle similar to that of the pixel density converter 37. The frame rate converter 38 configures a spatial filter based on the image data $D_{(n)}$ for a preceding screen stored in the frame memory, and based on the image data $D_{(n)}$ which is being input. Using the configured spatial filter, the frame rate of the image data $D_{(n)}$ is converted by thinning out data for an appropriate number of screens.

The second digital processing circuit 28 comprises a second filter 40, second contour emphasizer 41, and digitizer 42 as the structures for generating digitized data $Y_B$, which corresponds to the second image data.

Figure 4:
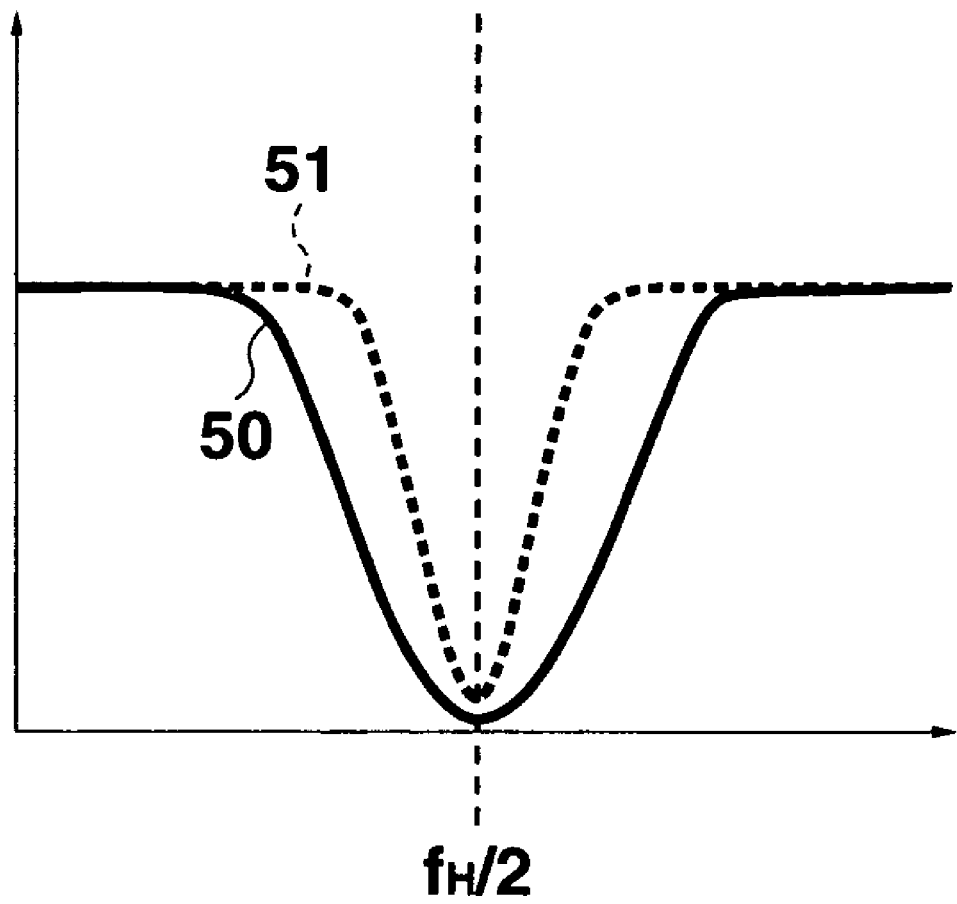
FIG. 4 is a graph illustrating the filter characteristics of the first and second filters 30, 40.

Similar to the first filter 30, the second filter 40 is a low-pass filter. The second filter 40 attenuates a second bandwidth of the image data $D_{(n)}$ so as to generate the second luminance data $Y_2$. This second filter 40 is provided separate from and in addition to the above-described first filter 30 because it is necessary attenuate the image data using different filter characteristics in order to produce an image data for display and an image data for barcode analysis. FIG. 4 is a graph schematically showing the filter characteristics of the first and second filters 30, 40, with frequency given on the horizontal axis and transmittance given on the vertical axis. Both filters are characterized in that a relative minimum point is present at one half (½) the horizontal sampling frequency $f_H$, such that output signals are attenuated in a frequency region around the relative minimum point. As compared to the characteristic 50 of the first filter 30, the characteristic 51 of the second filter 40 is set to have a steeper attenuation characteristic. More specifically, according to the characteristic 51, a signal is attenuated within a narrow second trap bandwidth having the center frequency of $f_H/2$. In contrast, according to the characteristic 50, a signal is attenuated within a relatively wide first trap bandwidth having the center frequency of $f_H/2$.

Figure 5:
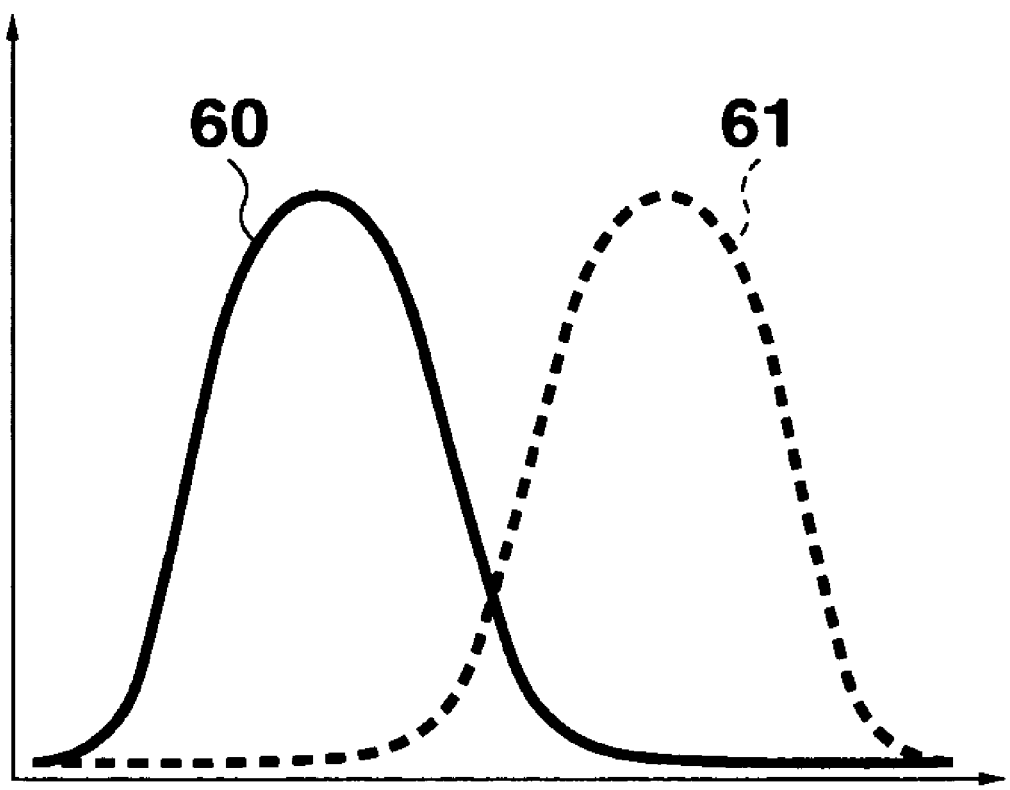
FIG. 5 is a graph illustrating the filter characteristics of first and second contour emphasizers 32, 41.

The second contour emphasizer 41 configures, based on the second luminance data $Y_2$ for a preceding line which is stored in a line memory, and based on the second luminance data $Y_2$ for one line which is input from the second filter 40, a spatial filter composed of a matrix including a predetermined number of values. Using the spatial filter, the second contour emphasizer 41 performs contour emphasis processing to generate the second luminance data $Y_2$ having emphasized contours. This separate second contour emphasizer 41 is provided apart from the first contour emphasizer 32 because it is necessary to emphasize different frequency bands in an image data for display and in an image data for barcode analysis. FIG. 5 is a graph schematically showing the filter characteristics of the first and second contour emphasizers 32, 41, with frequency given on the horizontal axis and transmittance given on the vertical axis. The filter characteristic 60 of the first contour emphasizer 32 has a relative maximum value within a frequency bandwidth with respect to which human eyes exhibit the highest sensitivity, so as to allow an output signal to be transmitted in a frequency region around the relative maximum value. In contrast, the filter characteristic 61 of the second contour emphasizer 41 has a relative maximum value in a higher frequency bandwidth as compared to the characteristic 60, allowing an output signal to be transmitted in a higher frequency region around the relative maximum value.

The digitizer 42 compares, in units of one pixel, the second luminance data $Y_2$ output from the second contour emphasizer 41 with a predetermined threshold value. The digitizer 42 then generates the digitized data $Y_B$ by designating a value of "1" when the second luminance data $Y_2$ is greater than the threshold value, and designating a value of "0" when the second luminance data $Y_2$ is smaller than the threshold value. In this manner, the gradation of the second luminance data $Y_2$ is reduced to two tone levels, and 1-bit data $Y_B$ which is expressed simply in black and white is produced.

According to the arrangement as described above, the imaging apparatus can output two types of output data, which are the first output data having a format appropriate for the display apparatus 2, and the second output data having a format appropriate for the system microcomputer 3. For example, when the CCD image sensor 21 is of VGA size, with 640 horizontal lines and 480 vertical columns, by driving the CCD image sensor 21 at a frame rate of 30 fps, it is possible to simultaneously output the first output data having a bit length of 8 bits, pixel density of 240×120, and frame rate of 7 fps, and the second output data having a bit length of 1 bit, pixel density of 640×480, and frame rate of 30 fps. Accordingly, the data required by both the display apparatus 2 and the system microcomputer 3 can be appropriately supplied. For example, in a barcode reader system, at the same time an image data for display is output to the display apparatus 2, an output data for barcode analysis processing can be sufficiently supplied, without resulting in data amount deficiency. As a result, degradation in barcode analysis accuracy can be prevented.

When an image processing for achieving a special effect is to be performed in the system microcomputer 3 in addition to barcode analysis, luminance data Y in the form of 8 bits×640× 480 and chrominance data U, V in the form of 8 bits×640×480 can be output by ceasing the operation of the pixel density conversion circuit 37. Because the pixel density conversion circuit 37 is operated in response to a timing signal from the timing control circuit 23, the operation of the pixel density conversion circuit 37 can be ceased by interrupting the supply of this timing signal.

While the digitizer 42 is provided in the second digital processing circuit 28 according to the example used to illustrate the present embodiment, the present invention is not limited to this configuration. For example, the second filter 40 and the second contour emphasizer 41 may be incorporated into the imaging apparatus 1', while the digitizing function may be performed on the system microcomputer 3 side.

Figure 6:
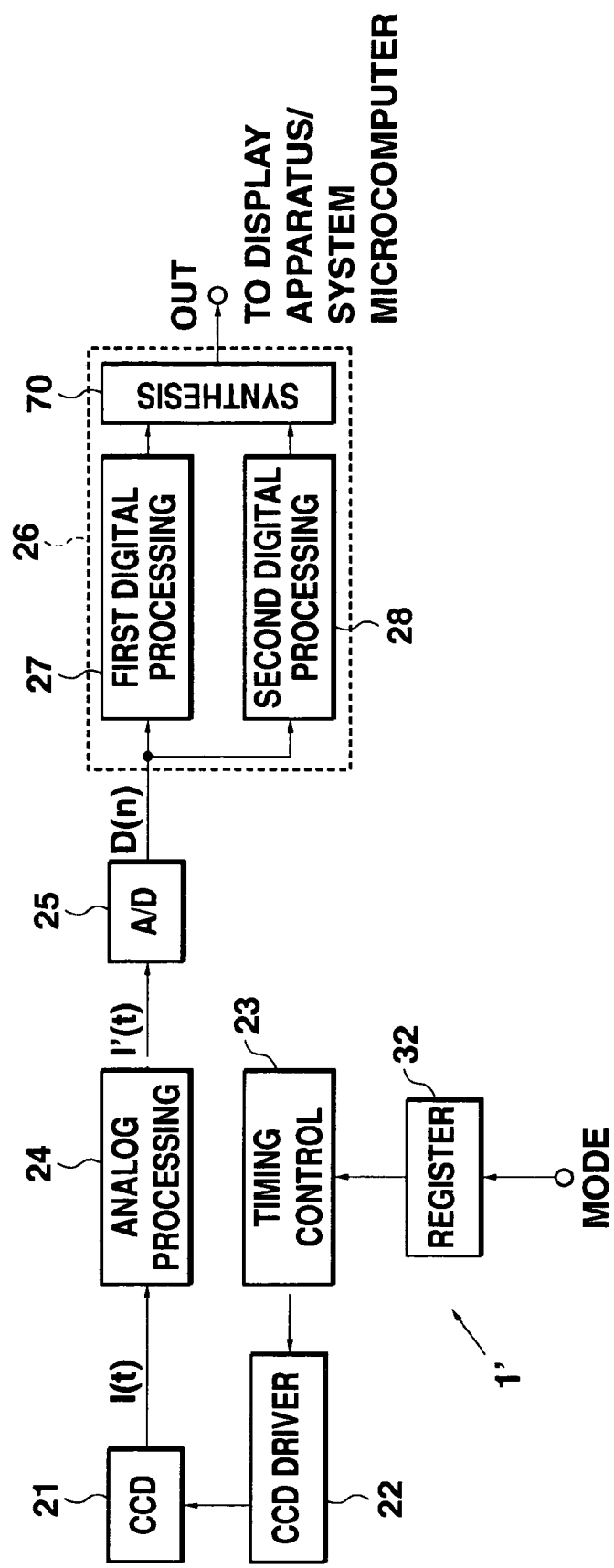
FIG. 6 is a block diagram showing the configuration of a second embodiment of the present invention.

FIG. 6 is a block diagram showing the configuration of a second embodiment of the present invention. In FIG. 6, elements that are identical to those in FIG. 1 are labeled with the same reference numerals, and explanation of those elements will not be repeated. The second embodiment differs from the first embodiment in that a synthesizing circuit 70 is provided for synthesizing outputs from the first and second digital processing circuits 27, 28.

The synthesizing circuit 70 acquires and synthesizes the outputs from the first and second digital processing circuits 27, 28, and supplies the synthesized data as output data $D_{(o)}$ to the display apparatus 2 and the system microcomputer 3. The synthesizing circuit 70 synthesizes the two sets of data from the respective digital processing circuits 27, 28 by allocating the output from the first digital processing circuit 27 to predetermined high-order bits of the output data $D_{(o)}$, and allocating the output from the second digital processing circuit 28 to predetermined low-order bits of the output data $D_{(o)}$.

Figure 7:
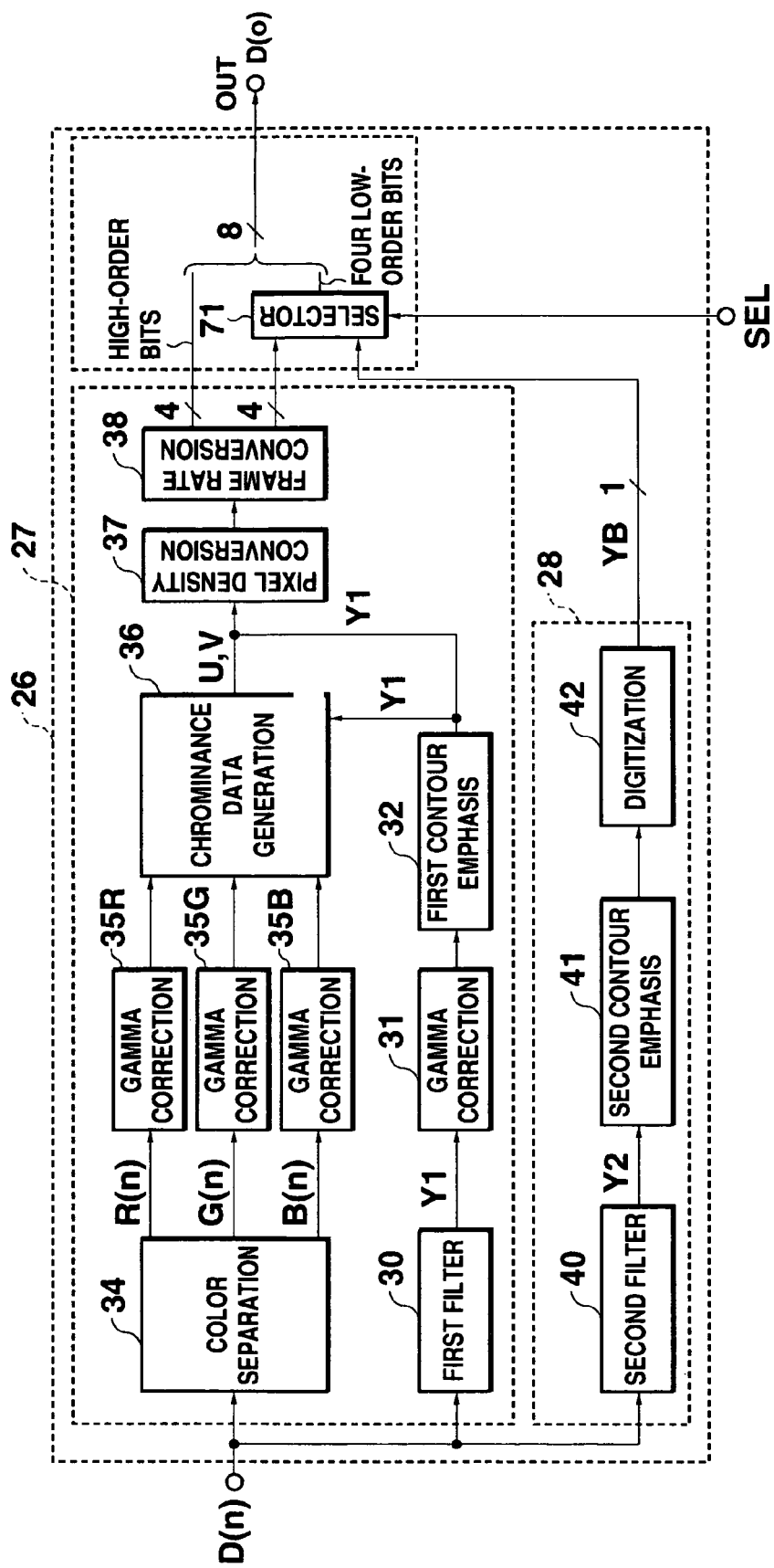
FIG. 7 is a block diagram showing the configuration of the digital processing circuit of FIG. 6.

FIG. 7 is a block diagram showing the configuration of the digital processing circuit 26 of the second embodiment. In FIG. 7, elements that are identical to those in FIG. 2 are labeled with the same reference numerals, and explanation of those elements will not be repeated.

After the 8-bit data composed of the first luminance data $Y_1$ or the chrominance data U or V has been subjected to frame rate conversion in the frame rate conversion circuit 38, the synthesizing circuit 70 acquires data of the four high-order bits of the 8-bit data and data of the four low-order bits of the 8-bit data. The synthesizing circuit 70 also acquires the 1-bit digitized data $Y_B$. The synthesizing circuit 70 synthesizes the acquired data, and outputs the synthesized data as the output data $D_{(o)}$. The synthesizing circuit 70 comprises a selector 71, and, among the three input data sets, the data of the four low-order bits of the first luminance data $Y_1$ or the chrominance data U, V, and the digitized data $Y_B$ are received at input terminals of the selector 71. In response to a selection signal SEL, the selector 71 selects and outputs either one of the data items received at the two input terminals. The synthesizing circuit 70 allocates the four high-order bits of the first luminance data $Y_1$ or the chrominance data U, V to four high-order bits of the output data $D_{(o)}$, and allocates the four low-order bits of the first luminance data $Y_1$ or the chrominance data U, V to four low-order bits of the output data $D_{(o)}$.

Figure 8:
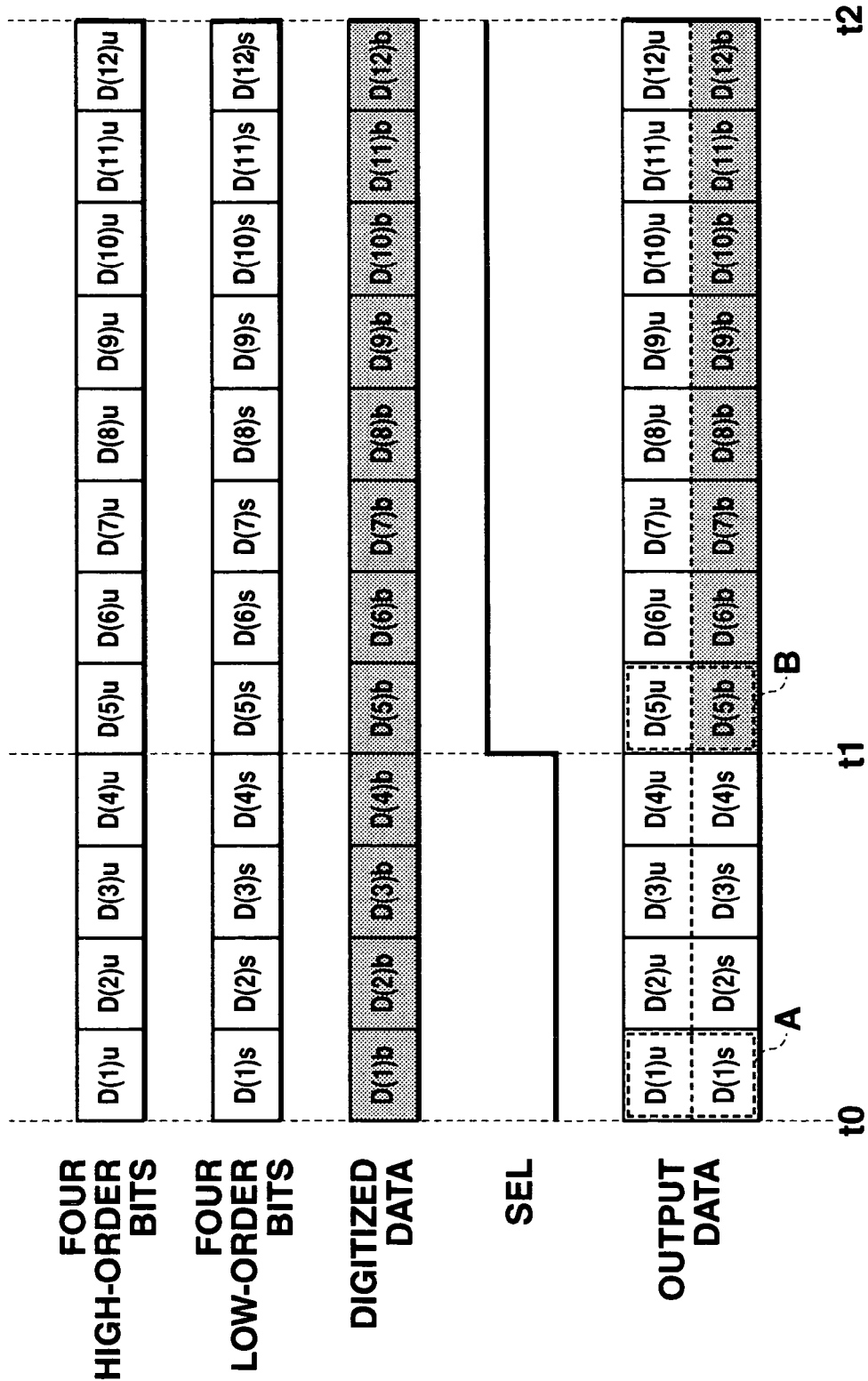
FIG. 8 is a timing chart for explaining the operation of FIG. 7.
Figure 9:
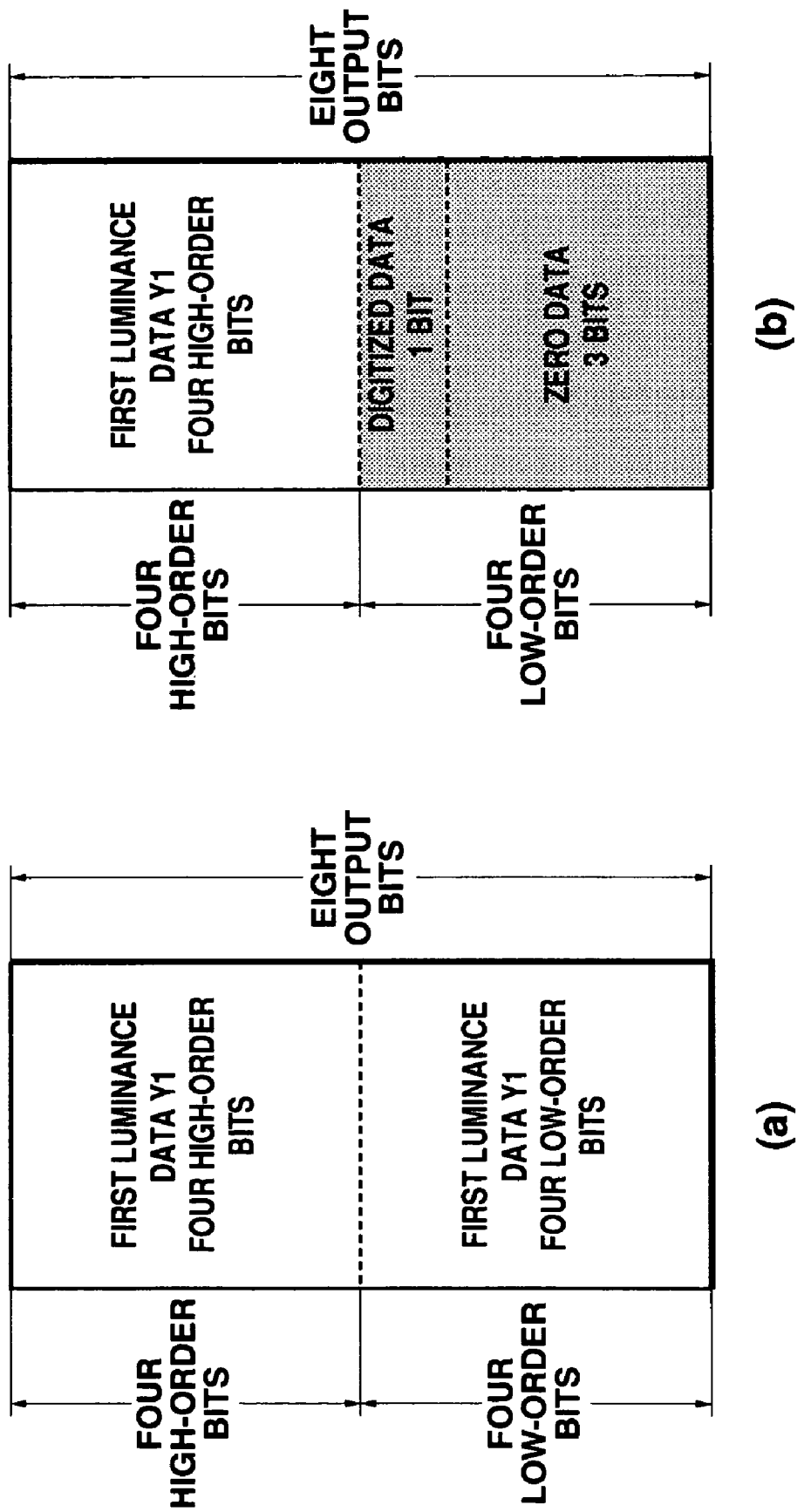
FIG. 9 is a diagram showing states of data in FIG. 8.

FIG. 8 is a timing chart for explaining the operation of FIG. 7. In FIG. 9, (a) and (b) are schematic diagrams showing states of data corresponding to A and B in FIG. 8, respectively. An example operation for a case in which the first luminance data $Y_1$ and the chrominance data U, V are not subjected to conversion processing by the pixel density conversion circuit 37 and the frame rate conversion circuit 38, and wherein, during the period between time t0 and time t1, the system operates only to supply a monitor output will next be described. During the period between time t1 and time t2, the system simultaneously performs barcode analysis processing and supplies the monitor output.

Concerning reference symbols in FIG. 8, $D_{(n)u}$ denotes four high-order bits of the first image data, while $D_{(n)s}$ denotes four low-order bits of the first image data. Each of the data items $D_{(n)u}$ and $D_{(n)s}$ is data for one pixel. Within a sequence of these data items for a plurality of pixels, data items corresponding to the first luminance data $Y_1$ and those corresponding to the chrominance data U and V are arranged in a predetermined order by time division.

During the period between time t0 and time t1, the selection signal SEL is set to LOW level in response to the mode signal MODE, such that the selector 71 selects its terminal for the four low-order bits $D_{(n)s}$ of the first image data. As a result, four low-order bits $D_{(1)s}$-$D_{(4)s}$ of the first image data are allocated to the four low bits among the eight bits of the output data $D_{(o)}$. As an example of the data state at this point, the data item denoted by A in FIG. 8 is illustrated in FIG. 9(a). As can be seen, four high-order bits and four low-order bits of the first luminance data $Y_1$ are allocated to the four high-order bits and four low-order bits of the output data $D_{(o)}$, respectively. When the chrominance data U or V is processed at this point, the eight bits of the chrominance data are used as the output data $D_{(o)}$, in a manner similar to that described above.

During the period between time t1 and time t2, the selection signal SEL is set to HIGH level in response to the mode signal MODE, such that the selector 71 selects the digitized data $Y_B$. As a result, digitized data $D_{(5)b}$-$D_{(12)b}$ are allocated to the four low bits of the output data $D_{(o)}$. At the same time, connection of a bus line (not shown) is changed so as to switch the destination of output of the four low bits of the output data $D_{(o)}$ from the display apparatus 2 to the system microcomputer 3. As an example of the state of data at this point, the data item denoted by B in FIG. 8 is illustrated in FIG. 9(b). As can be seen, four high-order bits of the first luminance data $Y_1$ are allocated to the four high-order bits of the output data $D_{(o)}$, while four bits composed of the digitized data $Y_B$ plus three bits of zero data are allocated to the four low-order bits of the output data $D_{(o)}$. The allocation of zero data can be achieved as follows. The output from the digitizer 42 may be set to four bits, and, among the four bits, the three bits other than the one bit corresponding to the digitized data may be connected to a ground.

Figure 10:
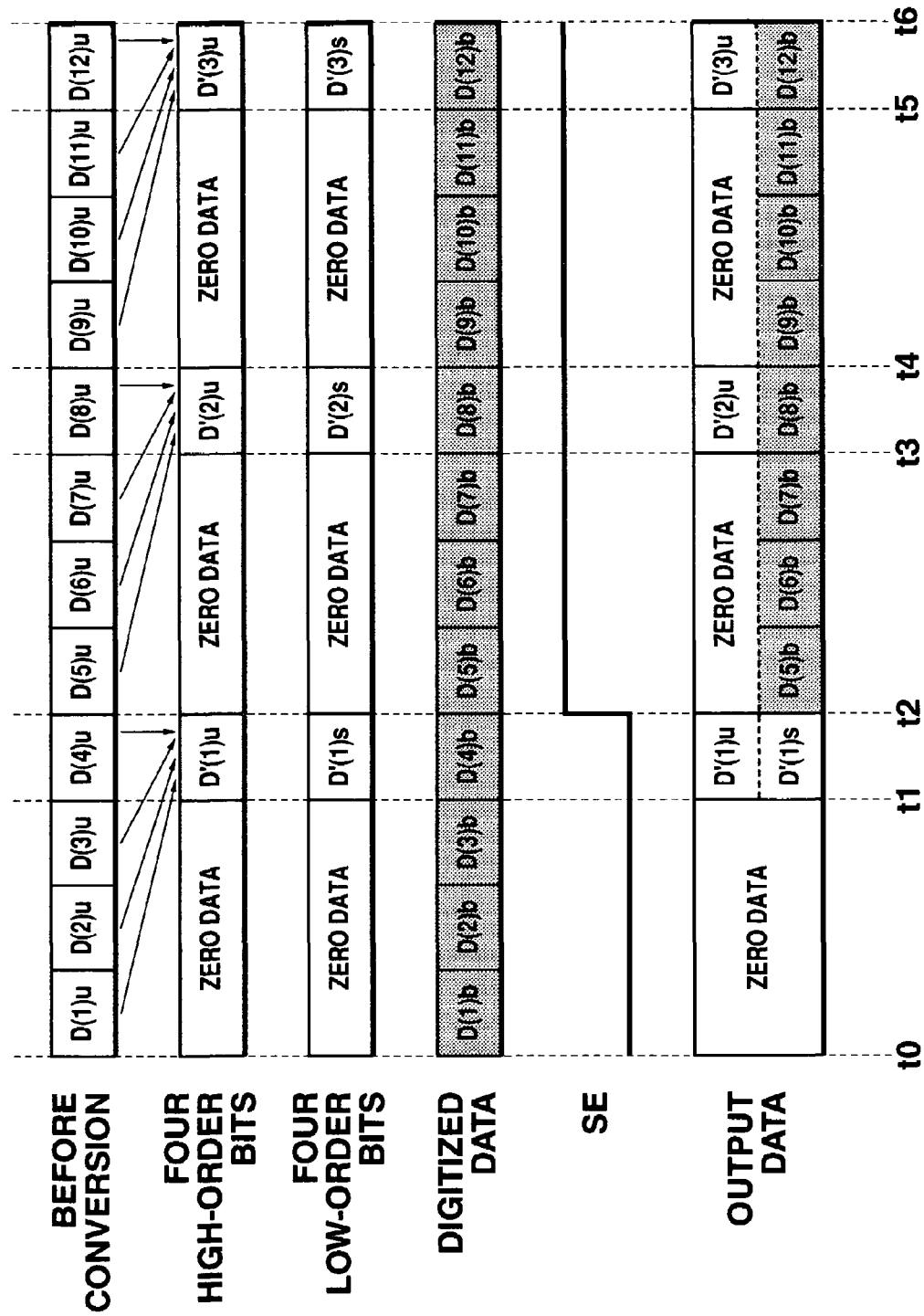
FIG. 10 is a timing chart for explaining the operation of FIG. 7.

Next described is a case in which the first luminance data $Y_1$ and the chrominance data U, V are subjected to conversion processing by the pixel density conversion circuit 37 and the frame rate conversion circuit 38. FIG. 10 is a timing chart illustrating the operation when conversion processes are performed on the first image data. In FIG. 10, during the period between time t0 and time t2, the system operates only to supply a monitor output. During the period between time t2 and time t6, the system simultaneously performs barcode analysis processing and supplies the monitor output.

During the period between time t0 and time t1, pixel density conversion processing is performed with respect to the first image data. Accordingly, the output of the pixel density conversion circuit 37 is fixed at value "0", and this value serves as the first image data. At this point, the selector 71 selects its terminal for the four low-order bits $D_{(n)s}$ of the first image data, and therefore outputs zeroes as the output data $D_{(o)}$.

During the period between time t1 and time t2, the image data $D'_{(1)}$ generated as a result of the pixel density conversion processing is output. Eight bits of the image data $D'_{(1)}$ are supplied as the output data $D_{(o)}$.

During the period between time t2 and time t3, the selected terminal of the selector 71 is switched to the digitized data $Y_B$ side in response to the switching of the mode signal MODE. During this period between time t2 and time t3, because pixel density conversion processing is being performed, the first image data is set to zero. Accordingly, in the output data $D_{(o)}$, zero data is allocated to the four high-order bits, while data $D'_{(5)b}$-$D'_{(7)b}$ composed of the digitized data $Y_B$ plus three bits of zero data are allocated to the four low-order bits. The identical operation is performed during the period between time t4 and time t5.

During the period between time t3 and time t4, the selected terminal of the selector 71 is maintained at the digitized data side, while the pixel density conversion circuit 37 outputs image data $D'_{(2)}$. Accordingly, in the output data $D_{(o)}$, four high-order bits $D'_{(2)u}$ of the image data $D'_{(2)}$ are allocated to the four high-order bits, while digitized data $D_{(8)b}$ is allocated to the four low-order bits.

According to this second embodiment of the present invention, data required by the display apparatus 2 and the system microcomputer 3 can be appropriately supplied, thereby achieving advantages similar to those of the first embodiment. Further, in the second embodiment, because the luminance data Y and the chrominance data U, V are synthesized with the digitized data $Y_B$ to generate the output data $D_{(o)}$, wiring lines for the output terminal OUT can be configured identically with those of a conventional 8-bit type, without the need to increase the number of wiring lines.

FIG. 10 relates to a case in which just pixel density conversion alone is performed. When frame rate conversion is performed, zero data is allocated during the period in which the first image data is not output, as shown in FIG. 10. Furthermore, as with the first embodiment, the second embodiment may be modified such that the imaging apparatus 1' does not include the digitizer 42 and incorporates only the second filter 40 and the second contour emphasizer 41.

Specific embodiments of the present invention were explained above referring to FIGS. 1-10. While a barcode reader system and an image processing system for achieving a special effect were referred to in the above embodiments as examples of applications of the present invention, the present invention is not limited to such systems. The present invention may be sufficiently practiced in any system in which image data are output from an imaging apparatus to a plurality of external apparatuses which require data having different formats.

The present invention makes it possible to provide an image data processing apparatus which is favorable for outputting image data to a plurality of external apparatuses which require data of different formats.

The invention claimed is:

1. An image data processing apparatus for performing a predetermined signal processing on input image data and generating output data for supplying to an external apparatus, the image data processing apparatus comprising:
  a first processing circuit for performing a first signal processing with respect to image data so as to produce a first set of image data; and
  a second processing circuit for performing with respect to the image data a second signal processing, which is independent from the first signal processing, so as to produce a second set of image data, wherein
  the first processing circuit comprises a first filter for attenuating a first bandwidth of the image data so as to generate a first luminance data, a gamma corrector for performing a gamma correction processing on the first luminance data, and a first contour emphasizer for performing a first contour emphasis processing with respect to the gamma-corrected data;
  the second processing circuit comprises a second filter for attenuating a second bandwidth of the image data so as to generate a second luminance data, and a second contour emphasizer for performing a second contour emphasis processing with respect to the second luminance data; and
  the first and second processing circuits execute the first and second signal processing in a parallel manner, and output the first and second sets of image data as output data.

2. The image data processing apparatus as defined in claim 1, wherein
  the first processing circuit further comprises a conversion circuit for changing at least one of pixel density or frame rate of the luminance data.

3. The image data processing apparatus as defined in claim 2, wherein
  the second processing circuit further comprises a digitizer for digitizing an output from the second contour emphasizer so as to generate a digitized data.

4. The image data processing apparatus as defined in claim 3, further comprising
  a synthesizing circuit for allocating an output from the first processing circuit and an output from the second processing circuit to predetermined high-order bits and predetermined low-order bits of the output data, respectively, so as to synthesize the outputs.

* * * * *